United States Patent
Choe et al.

(10) Patent No.: US 9,445,077 B2
(45) Date of Patent: Sep. 13, 2016

(54) METHOD AND APPARATUS FOR PROCESSING BROADCAST SIGNAL FOR 3-DIMENSIONAL BROADCAST SERVICE

(75) Inventors: Jeehyun Choe, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 14/125,542

(22) PCT Filed: Jun. 20, 2012

(86) PCT No.: PCT/KR2012/004877
§ 371 (c)(1),
(2), (4) Date: Dec. 13, 2013

(87) PCT Pub. No.: WO2012/177049
PCT Pub. Date: Dec. 27, 2012

(65) Prior Publication Data
US 2014/0375764 A1    Dec. 25, 2014

Related U.S. Application Data

(60) Provisional application No. 61/499,677, filed on Jun. 21, 2011, provisional application No. 61/599,433, filed on Feb. 16, 2012, provisional application No. 61/602,073, filed on Feb. 22, 2012.

(51) Int. Cl.
*H04N 13/00* (2006.01)
*H04N 13/04* (2006.01)
(Continued)

(52) U.S. Cl.
CPC .......... *H04N 13/0048* (2013.01); *H04N 5/455* (2013.01); *H04N 13/007* (2013.01);
(Continued)

(58) Field of Classification Search
CPC ..................... H04N 13/0048; H04N 13/0059
USPC .......................................................... 348/43
See application file for complete search history.

(56) References Cited

U.S. PATENT DOCUMENTS

2010/0074594 A1* 3/2010 Nakamura ........... H04N 13/007
386/241
2011/0012896 A1 1/2011 Ji
(Continued)

FOREIGN PATENT DOCUMENTS

CN          1893675 A      1/2007
JP       2005-006114 A      1/2005
(Continued)

*Primary Examiner* — Jeffery Williams
(74) *Attorney, Agent, or Firm* — Dentons US LLP

(57) ABSTRACT

The disclosed apparatus for receiving a broadcast signal including 3D content comprises a receiving unit configured to receive a broadcast signal including video data for 3D content, a decoder configured to decode the video data for the 3D content from the received broadcast signal, a signaling processor configured to parse depth information from the decoded video data, a graphic engine configured to determine a depth for displaying an on screen display, OSD, of a receiver, a formatter configured to form images including the OSD located at the depth for the 3D content, and a display unit configured to display the images, wherein the depth information includes partition information indicating partitioning pattern of an image, several regions of the image are defined by the partition information, wherein the depth information further includes max disparity information specifying maximum disparity value in the image and min disparity information specifying the minimum disparity value in a region of the several regions.

11 Claims, 18 Drawing Sheets

(51) Int. Cl.
*H04N 21/2362* (2011.01)
*H04N 21/431* (2011.01)
*H04N 21/434* (2011.01)
*H04N 21/81* (2011.01)
*H04N 5/455* (2006.01)

(52) U.S. Cl.
CPC ...... *H04N13/0059* (2013.01); *H04N 13/0452* (2013.01); *H04N 21/2362* (2013.01); *H04N 21/434* (2013.01); *H04N 21/4316* (2013.01); *H04N 21/4345* (2013.01); *H04N 21/816* (2013.01)

(56) References Cited

U.S. PATENT DOCUMENTS

| | | |
|---|---|---|
| 2011/0023066 A1 | 1/2011 | Jang et al. |
| 2011/0037833 A1* | 2/2011 | Lee ............... H04N 13/007 348/46 |
| 2011/0109728 A1 | 5/2011 | Yoo et al. |
| 2011/0115880 A1 | 5/2011 | Yoo et al. |
| 2011/0128269 A1 | 6/2011 | Lee et al. |
| 2011/0141235 A1 | 6/2011 | Tsukagoshi |
| 2011/0273440 A1* | 11/2011 | Park ............... G09G 3/003 345/419 |
| 2011/0292175 A1* | 12/2011 | Suh ............... H04N 13/0059 348/43 |
| 2012/0120200 A1* | 5/2012 | Newton ............ H04N 13/0003 348/46 |

FOREIGN PATENT DOCUMENTS

| | | |
|---|---|---|
| WO | 2010-093115 A2 | 8/2010 |
| WO | 2010-095074 A1 | 8/2010 |
| WO | 2011-013030 A1 | 2/2011 |
| WO | 2011-030234 A1 | 3/2011 |
| WO | 2011-059270 A2 | 5/2011 |

* cited by examiner

Fig. 3

| Syntax | No. of bits | Format |
|---|---|---|
| Extended_video_depth_range_descriptor ( ) { | | |
|     descriptor_tag | 8 | uimsbf |
|     descriptor_length | 8 | uimsbf |
|     descriptor_tag_extension | 8 | uimsbf |
|     for (i=0 ; i<N ; i++) { | | |
|         range_type | 8 | uimsbf |
|         range_length | 8 | uimsbf |
|         if (range_type == 0) { | | |
|             production_disparity_info ( ) | | |
|         else if (range_type == 1) { | | |
|             video_with_open_overlay_disparity_info ( ) | | |
|         } else { | | |
|             for (i=0 ; i<range_length ; i++) { | | |
|                 range_selector_byte | 8 | bslbf |
|             } | | |
|         } | | |
|     } | | |
| } | | |

Fig. 4

| range_type | Description |
|---|---|
| 0x00 | production disparity hint |
| 0x01 | Video with Open (Embedded) overlay disparity hint |
| 0x02 to 0xFF | Reserved for future use |

| Syntax | Number of bits | Identifier |
|---|---|---|
| production_disparity_hint_info ( ) { | | |
|     video_max_disparity_hint | 12 | tcimsbf |
|     video_min_disparity_hint | 12 | tcimsbf |
| } | | |

Fig. 5

| Syntax | No. of bits | Format |
|---|---|---|
| video_with_open_overlay_disparity_info ( ) { | | |
|   disparity_for_video_only ( ) | | |
|   2D_extraction_method | 3 | uimsbf |
|   floating_window_present | 2 | uimsbf |
|   num_of_overlay | 3 | uimsbf |
|   for (i=0; i<num_of_overlay; i++) { | | |
|     open_overlay_type | 8 | uimsbf |
|     open_overlay_priority | 8 | uimsbf |
|     disparity_for_open_overlay ( ) | | |
|     open_overlay_area_info ( ) | | |
|   } | | |
| } | | |

| Syntax | Number of bits | Identifier |
|---|---|---|
| disparity_for_open_overlay ( ) { | | |
|   open_overlay_max_disparity | 12 | tcimsbf |
|   open_overlay_min_disparity | 12 | tcimsbf |
| } | | |

Fig. 6

| Syntax | Number of bits | Identifier |
|---|---|---|
| open_overlay_area_info () { | | |
|   grid_type | 1 | uimsbf |
|   grid_base_view_flag | 1 | uimsbf |
|   reserved | 6 | uimsbf |
|   grid_x | 12 | uimsbf |
|   grid_y | 12 | uimsbf |
|   grid_height | 12 | uimsbf |
|   grid_width | 12 | uimsbf |
|   if (grid_type == 1) { | | |
|     grid_num_horizontal_pixels | 11 | uimsbf |
|     grid_num_vertical_pixels | 11 | uimsbf |
|     reserved | 2 | '11' |
|     ref_resolution_width | 8 | uimsbf |
|     ref_resolution_height | 8 | uimsbf |
|   } | | |
| } | | |

Fig. 7

| Syntax | No. of bits | Format |
|---|---|---|
| terrestrial_virtual_channel_table_section ( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=o; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor( ) | | |
|     } | | |
|   } | | |
|   reserved | 6 | '111111' |
|   additional_descriptors_lengh | 10 | uimsbf |
|   for (j=0; j<N; j++) { | | |
|     additional_descriptor( ) | | |
|   } | | |
|   CRC_32 | 32 | rpchof |
| } | | | descriptor( ) → Extended_video_depth_range_descriptor

Fig. 8

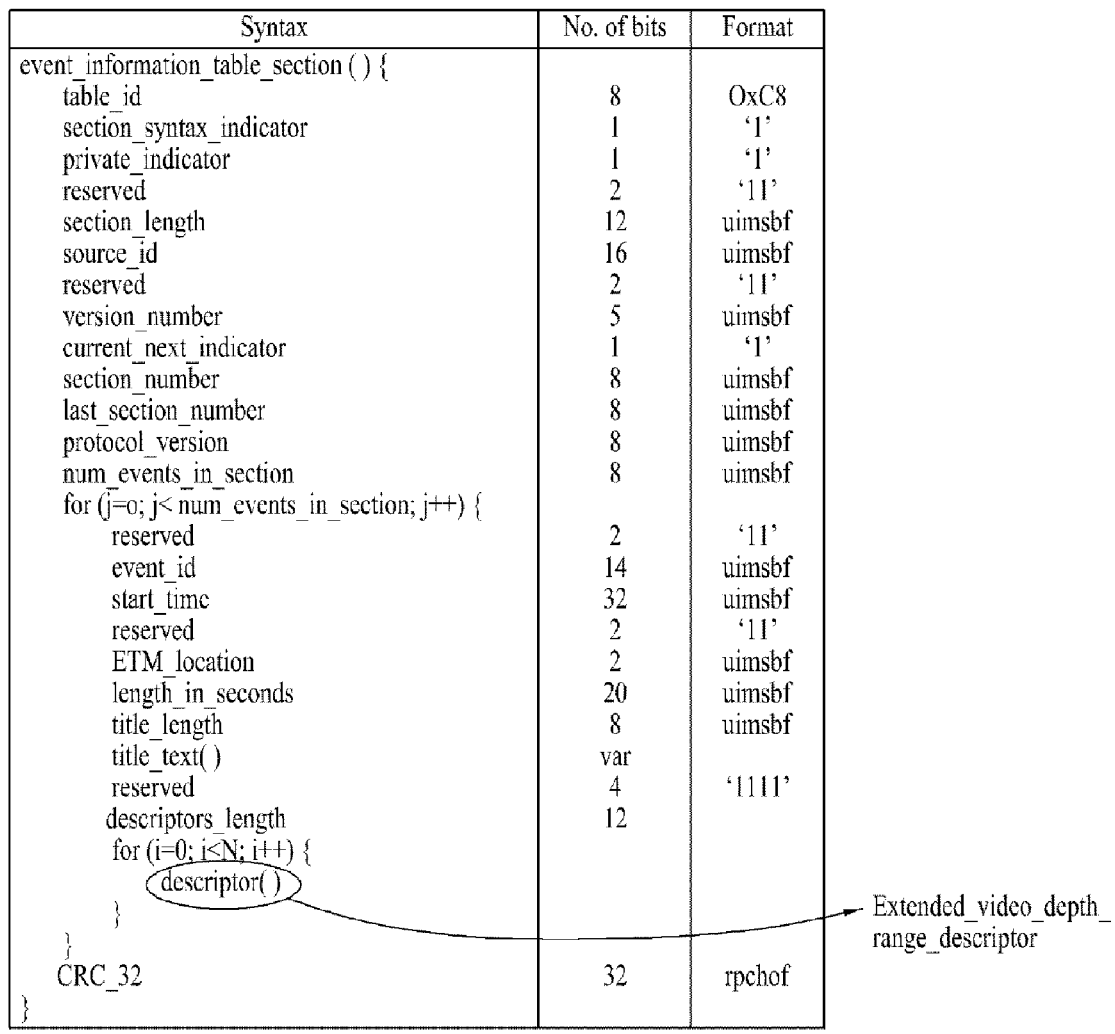

| Syntax | No. of bits | Format |
|---|---|---|
| event_information_table_section ( ) { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=o; j< num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text( ) | var | |
|         reserved | 4 | '1111' |
|         descriptors_length | 12 | |
|         for (i=0; i<N; i++) { | | |
|             descriptor( ) | | |
|         } | | |
|     } | | |
|     CRC_32 | 32 | rpchof |
| } | | |

← Extended_video_depth_range_descriptor

| Syntax | Number of bits | Identifier |
|---|---|---|
| embedded_overlay_depth_data ( ) { | | |
|    disparity_for_video_only ( ) | | |
|    2D_extraction_method | 3 | uimsbf |
|    floating_window_present | 2 | uimsbf |
|    num_of_overlay | 3 | uimsbf |
|    for (i=0; i<num_of_overlay; i++) { | | |
|       open_overlay_type | 8 | uimsbf |
|       open_overlay_priority | 8 | uimsbf |
|       disparity_for_open_overlay ( ) | | |
|       open_overlay_area_info ( ) | | |
|    } | | |
| } | | |

Fig. 12

| Syntax | No. of bits | Format |
|---|---|---|
| 3D_Scene_Depth_Info_descriptor ( ) { | | |
| descriptor_tag | 8 | 0xTBD |
| descriptor_length | 8 | uimsbf |
| reserved | 1 | bslbf |
| scene_format_type | 2 | bslbf |
| first_scene_start_time | 5 | uimsbf |
| number_of_scenes | 8 | uimsbf |
| if (scene_format_type="10") { | | |
| scene_duration | 16 | uimsbf |
| for (i = 0; I < number_of_scenes; i++) { | | |
| scene_id | 8 | uimsbf |
| scene_disparity_info () | | |
| } | | |
| } | | |
| else if (scene_format_type="11") { | | |
| for (i = 0; I < number_of_scenes; i++) { | | |
| scene_id | 8 | uimsbf |
| scene_start_time | 16 | uimsbf |
| scene_duration | 16 | uimsbf |
| scene_disparity_info () | | |
| } | | |
| } | | |
| } | | |

Fig. 13

| Value of scene_format_type | Description |
|---|---|
| '00' ~ '01' | Reserved |
| '10' | Scene is defined by constant length video segment, its length is defined by scene_duration |
| '11' | Each scene has a variable duration and defined by scene_start_time and scene_duration |

| Syntax | No. of bits | Format |
|---|---|---|
| Scene_disparity_into( ) { | | |
|     disparity_for_video_only ( ) | | |
|     floating_window_present | 2 | uimsbf |
|     reserved | 3 | '111' |
|     for (i=0; i<N; i++) { | | |
|         open_overlay_type | 8 | uimsbf |
|         open_overlay_priority | 8 | uimsbf |
|         disparity_for_open_overlay ( ) | | |
|         open_overlay_area_info ( ) | | |
|     } | | |
| } | | |

Fig. 17

| Syntax | No. of bits | Constraints |
|---|---|---|
| PES_packet ( ) { | | |
|     packet_start_code_prefix | 24 | |
|     stream_id | 8 | Set to '1011 1101' indicating "private_stream_1" |
|     PES_packet_length | 16 | Set to a value that specifies the length of the PES packet, as defined in ISO/IEC 13818-1 |
|     ... | | |
|     data_alignment_indicator | 1 | Set to '1' indicating that the subtitle segments are aligned with the PES packets |
|     ... | | |
|     PTS | 40 | PTS (33 bits) + marker bits. The PTS, indicating the time at which the presentation begins of the display set carried by the PES packet(s) with this PTS |
|     PES_packet_data_byte ( ) { | | |
|         depth_information_data ( ) | | |
|     } | | |
| } | | |

Fig. 18

| Syntax | No. of bits | Constraints |
|---|---|---|
| depth_information_data ( ) { | | |
|     depth_update_flag | 1 | uimsbf |
|     event_min_disparity | 12 | uimsbf |
|     event_max_disparity | 12 | uimsbf |
|     num_of_scenes | 8 | uimsbf |
|     for ( i=0 ; num_of_scenes ; i++ ) { | | |
|         scene_id | 8 | uimsbf |
|         scene_start_time | 33 | uimsbf |
|         scene_duration | 16 | uimsbf |
|         scene_min_disparity | 16 | uimsbf |
|         scene_max_disparity | 16 | uimsbf |
|         region_depth_data( ) | | |
|     } | | |
| } | | |

Fig. 19

| Syntax | No. of bits | Format |
|---|---|---|
| region_depth_data( ) { | | |
| num_of_regions | 5 | bslbf |
| grid_base_view_flag | 1 | bslbf |
| grid_type | 1 | bslbf |
| reserved (set to "1") | 1 | bslbf |
| if (grid_type == 1) { | | |
| grid_num_hor_pixels | 11 | uimsbf |
| grid_num_ver_pixels | 11 | uimsbf |
| ref_resolution_width | 8 | uimsbf |
| ref_resolution_height | 8 | uimsbf |
| reserved (set to "11") | 2 | bslbf |
| } | | |
| for (i=0 ; i < num_of_regions ; i++) { | | |
| region_id | 8 | uimsbf |
| region_min_disparity | 12 | tcimsbf |
| region_max_disparity | 12 | tcimsbf |
| if (grid_type == 0) { | | |
| x_coordinate | 12 | bslbf |
| y_coordinate | 12 | bslbf |
| region_width | 12 | bslbf |
| region_height | 12 | bslbf |
| } | | |
| } | | |
| } | | |

Fig. 20

| Syntax | Number of bits | Identifier |
|---|---|---|
| user_data_registered_itu_t_t35 ( ) { | | |
|    itu_t_t35_country_code | 8 | bslbf |
|    itu_t_t35_provider_code | 16 | bslbf |
|    user_identifier | 32 | bslbf |
|    user_structure( ) | | |
| } | | |

| user_identifier | user_structure( ) |
|---|---|
| 0x47413934 ('GA94') | DVB1_data( ) |
| 0x44544731 ('DTG1') | afd_data( ) |

| Syntax | No. of bits | Format |
|---|---|---|
| DVB1_data ( ) { | | |
|    user_data_type_code | 8 | uimsbf |
|    user_data_type_structure ( ) | | |
| } | | |

| user_data_type_code | user_data_type_structure() |
|---|---|
| 0x00 to 0x02 | DVB Reserved |
| 0x03 | cc_data() |
| 0x04 | depth_data() |
| 0x05 | DVB Reserved |
| 0x06 | bar_data() |
| 0x07 to 0xFF | DVB Reserved |

Fig. 21

| Syntax | No. of bits | Identifier |
|---|---|---|
| depth_data() { | | |
|   depth_update_flag | 1 | uimsbf |
|   grid_base_view_flag | 1 | bslbf |
|   grid_type | 1 | bslbf |
|   reserved (set to "11 111") | 5 | bslbf |
|   event_min_disparity | 12 | tcimsbf |
|   event_max_disparity | 12 | tcimsbf |
|   scene_min_disparity | 12 | tcimsbf |
|   scene_max_disparity | 12 | tcimsbf |
|   if (grid_type == 1) { | | |
|     grid_num_hor_pixels | 11 | uimsbf |
|     grid_num_ver_pixels | 11 | uimsbf |
|     ref_resolution_width | 8 | uimsbf |
|     ref_resolution_height | 8 | uimsbf |
|   } | | |
|   num_of_regions | 5 | bslbf |
|   reserved (set to "111") | 3 | bslbf |
|   for (i=0 ; i < num_of_regions ; i++) { | | |
|     region_id | 8 | uimsbf |
|     region_min_disparity | 12 | tcimsbf |
|     region_max_disparity | 12 | tcimsbf |
|     if (grid_type == 0) { | | |
|       x_coordinate | 12 | bslbf |
|       y_coordinate | 12 | bslbf |
|       region_width | 12 | bslbf |
|       region_height | 12 | bslbf |
|     } | | |
|   } | | |
| } | | |

METHOD AND APPARATUS FOR PROCESSING BROADCAST SIGNAL FOR 3-DIMENSIONAL BROADCAST SERVICE

This application is a 35 USC §371 National Stage entry of International Application No. PCT/KR2012/004877 filed on Jun. 20, 2012, and claims priority of U.S. Provisional Application Nos. 61/499,677 filed on Jun. 21, 2011; 61/602,073 filed on Feb. 22, 2012 and 61/599,433 filed on Feb. 16, 2012, which are hereby incorporated by reference in its entirety.

TECHNICAL FIELD

The present invention relates to a method and apparatus for receiving, processing and providing a three-dimensional (3D) broadcast service. More particularly, the invention relates to a method and apparatus for reducing an effect on THE 3D broadcast service even when functions of internal components of a broadcast receiver are used.

BACKGROUND ART

Popularization of 3D television (3DTV) activates not only supply of 3D video content according to storage media but also transmission of 3D video content according to digital broadcast.

In general, a 3D image provides user's eyes with a stereoscopic effect using the stereoscopic visual principle of the eyes. A human being feels perspective through a binocular parallax caused by a distance between his or her eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

To provide a 3D broadcast service, it is necessary to respectively transmit the left view image and the right view image and appropriately process the left view image and the right view image by a broadcast receiver to generate a 3D image. Accordingly, additional signaling information for 3D broadcast signal processing is needed.

A 3D broadcast signal is generated in a broadcasting station and transmitted therefrom. An on-screen display (OSD) used in the broadcast receiver is generated by the broadcast receiver and does not take into account the 3D broadcast service. When an OSD of the broadcast receiver is displayed while 3D broadcast content is displayed, a user may be hindered from viewing the 3D broadcast content since display of the OSD does not take into account depth information of the 3D broadcast content.

Furthermore, an overlay embedded in 3D broadcast content may be displayed having a depth different from that of the 3D broadcast content. In this case, it is necessary to take into account the depths of the embedded overlay and 3D broadcast content when the broadcast receiver displays the OSD (embedded overlay).

DISCLOSURE OF INVENTION

Technical Problem

An object of the present invention devised to solve the problem lies in processing of a broadcast signal such that an OSD does not disturb display of 3D broadcast content when a 3D broadcast receiver displays the OSD.

Solution to Problem

To achieve these objects and other advantages and in accordance with the purpose of the invention, as embodied and broadly described herein, an apparatus for receiving a broadcast signal including 3D content is suggested. The apparatus comprises a receiving unit configured to receive a broadcast signal including video data for 3D content, a decoder configured to decode the video data for the 3D content from the received broadcast signal, a signaling processor configured to parse depth information from the decoded video data, a graphic engine configured to determine a depth for displaying an OSD of a receiver, a formatter configured to form images including the OSD located at the depth for the 3D content, and a display unit configured to display the images, wherein the depth information includes partition information indicating partitioning pattern of an image, several regions of the image are defined by the partition information, wherein the depth information further includes maximum disparity information specifying maximum disparity value in the image and minimum disparity information specifying the minimum disparity value in a region of the several regions.

In another aspect of the present invention, the depth information further includes region identification information identifying each region of the several regions.

In another aspect of the present invention, the depth information further includes switch information indicating whether to switch the 3D content to 2-dimensional, 2D, content while the OSD is overlaid onto the 3D content.

In another aspect of the present invention, the depth information further includes number information indicating the number of regions in horizontal axis or vertical axis of the image.

In another aspect of the present invention, the depth information is included in a SEI massage.

In another aspect of the present invention, the depth information further includes priority information specifying priority for displaying of the region identified by the region identification information.

In another aspect of the present invention, the graphic engine is further configured to determine the OSD not to overlay the 3D content of the region when a value of the priority information exceeds a threshold value.

In another aspect of the present invention, provided herein is a method for transmitting a broadcast signal including 3D content at a transmitter. The method comprises encoding depth information, encoding video data including the depth information for 3D content, and transmitting a broadcast signal including the video data, wherein the depth information includes partition information indicating partitioning pattern of an image, several regions of the image are defined by the partition information, wherein the depth information further includes maximum disparity information specifying maximum disparity value in the image and minimum disparity information specifying the minimum disparity value in a region of the several regions.

Advantageous Effects of Invention

According to the present invention, a broadcast receiver can display an OSD such that the OSD does not distort 3D broadcast content.

According to the present invention, it is possible to display an OSD in consideration of the capacity of the broadcast receiver.

According to the present invention, it is possible to display an OSD such that an overlay region embedded in 3D broadcast content is not distorted.

BRIEF DESCRIPTION OF DRAWINGS

The accompanying drawings, which are included to provide a further understanding of the invention, illustrate embodiments of the invention and together with the description serve to explain the principle of the invention. In the drawings:

FIG. 3 shows an extended video depth range descriptor when a 3D mode is signaled at a system level according to an embodiment of the present invention;

FIG. 4 shows a range_type field and a production_disparity_hint_info field according to an embodiment of the present invention;

FIG. 5 shows a video_with_open_overlay_disparity_info information according to an embodiment of the present invention;

FIG. 6 shows an open_overlay_area_info ( ) information according to an embodiment of the present invention;

FIG. 7 shows a virtual channel table (VCT) according to an embodiment of the present invention;

FIG. 8 shows an event information table (EIT) according to an embodiment of the present invention;

FIG. 12 shows a 3D_scene_depth_info_descriptor according to an embodiment of the present invention;

FIG. 13 shows definition of a scene_format_type field and a scene_disparity_info information according to an embodiment of the present invention;

FIG. 17 shows a structure of a PES packet according to an embodiment of the present invention;

FIG. 18 shows depth_information_data ( ) according to an embodiment of the present invention;

FIG. 19 shows region_depth_data ( ) according to an embodiment of the present invention;

FIG. 20 illustrates a method for providing depth information through a SEI message according to an embodiment of the present invention;

FIG. 21 shows depth_data ( ) according to an embodiment of the present invention;

BEST MODE FOR CARRYING OUT THE INVENTION

Figure 1:
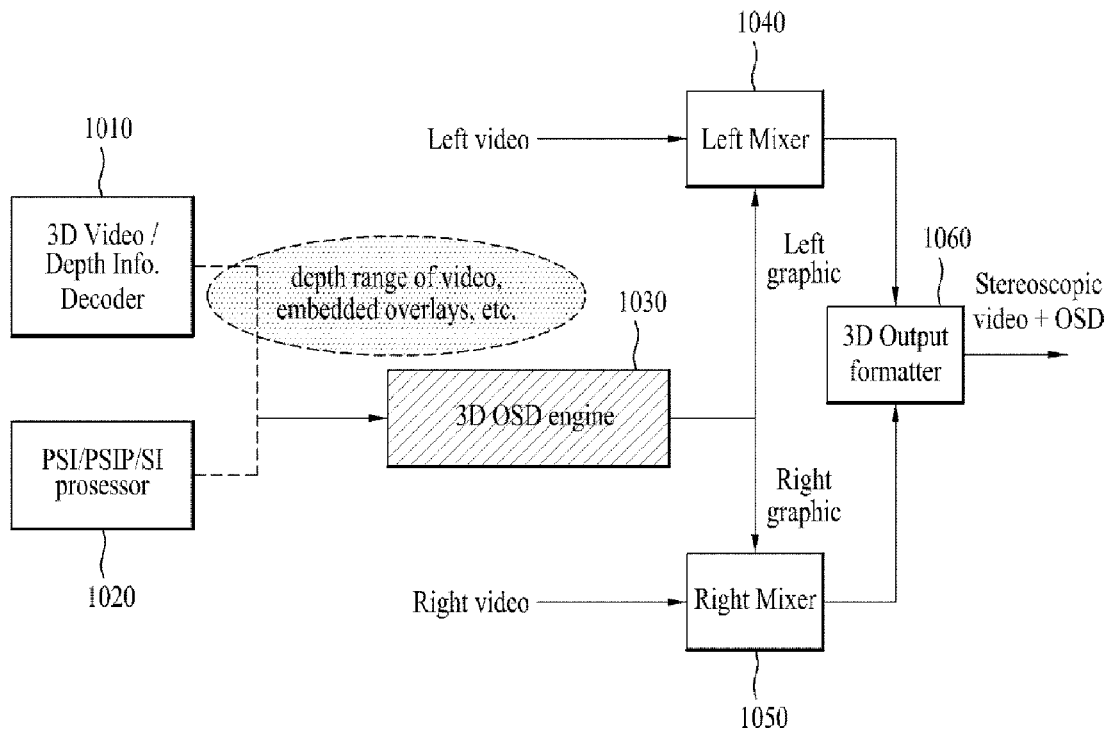
FIG. 1 illustrates a 3D broadcast receiver according to an embodiment of the present invention.

The attached drawings and embodiments of the present invention will be described in detail with reference to the attached drawings, which should not be construed as limiting the present invention.

In addition, although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

3DTV broadcast may transmit minimum and maximum disparity values of video content as information necessary to float an overlay. When it is necessary to display an overlay such as an OSD while the video content is broadcast, a broadcast receiver can minimize distortion of the 3D effect of the video content by displaying the overlay at an appropriate depth using the information.

An embedded overlay (or an open overlay) means a graphic image included in a video signal and transmitted, such as a broadcasting station logo, open caption, etc. which is not video data. The embedded overlay is data that must be displayed when a receiver decodes a video stream, distinguished from a closed caption, subtitle, etc. That is, the embedded overlay means a caption or graphic (e.g. a game score, an entertainment program caption, a news bulletin, etc.) embedded in content. A closed caption/closed graphic means a caption or graphic transmitted as a separate stream.

In case of 3D broadcast, there is a high possibility that there is a difference between a depth range of a 3D video and a depth range in which an embedded overlay is located. That is, since the embedded overlay may be generated separately from broadcast content, depth ranges of the embedded overlay and the broadcast content are different from each other. Accordingly, when a UI, graphic or the like is floated on a 3D screen according to user interaction while 3D video content is being viewed, it is necessary to provide information about an embedded overlay region and depth information of the region corresponding to the 3D video content. If the information about the embedded overlay region is provided, the receiver may use a method of avoiding the embedded overlay region according to importance of data regarding the 3D video content region or may determine the depth of the UI/graphic based on the depth of background video data. If the depth range of a specific area which does not correspond to an open overlay is considerably different from those of other areas, it is possible to exclude information applied to the specific area from disparity information of the corresponding video, to designate the specific area as an additional open overlay area and to separately signal disparity information of the additional open overlay area.

Therefore, a receiver operation mechanism for deriving a disparity range and overlay area of the embedded overlay and a disparity range of a video part except the overlay is needed, and related broadcast signaling needs to be supported for the receiver operation mechanism. The receiver can support display of ODS compatible with the 3D broadcast service by appropriately processing the broadcast signaling.

FIG. 1 illustrates a 3D broadcast receiver according to an embodiment of the present invention.

While the following description is based on a broadcast receiver, the broadcast receiver according to the present invention can include not only a device that decodes and displays a broadcast signal but also a device that decodes and displays Blueray, video CD, game content, etc.

Referring to FIG. 1, a 3D broadcast receiver may include a 3D depth information decoder 1010, a PSI/PSIP/SI processor 1020, a 3D OSD engine 1030, a left mixer 1040, a right mixer 1050, and/or a 3D output formatter 1060.

A receiver that supports stereo 3D broadcast may include a module for processing service information (SI). The SI includes PSI/PSIP/SI, DVB signaling information, or 3D video/depth information that may be included in the PSI/PSIP/SI and DVB signaling information.

The 3D depth information decoder 1010 parses 3D depth information.

The PSI/PSIP/SI processor 1020 processes program specific information (PSI), program and system information protocol (PSIP), and/or SI. According to an embodiment of the present invention, the 3D data depth information decoder 1010 and the PSI/PSIP/SI decoder 1020 can be treated as one unit.

The 3D OSD engine 1030 may process a display position of an OSD with reference to basic disparity range information limited to a disparity range on a program/channel/service basis or a disparity range on an event basis. Information about the disparity range may be included in the SI and transmitted to the receiver.

The 3D OSD engine 1030 may process the OSD such that the OSD can be effectively displayed on a specific region having disparity range property, such as an embedded overlay included in a video, by taking into account the specific region. In this case, the 3D OSD engine 1030 can control a new receiver operation mechanism. The 3D OSD engine 1030 may use signaling information in a system layer through PSI/SI/PSIP or signaling information using a video header region. An embedded overlay may include a logo, a score board, and/or a caption that explains an emergency. That is, the present invention proposes a scheme of appropriately outputting an embedded overlay in consideration of the depth range and location of the embedded overlay when the embedded overlay is included in a 3DTV video stream. A description will be given of depth range information signaling and a method for controlling a 3D overlay output suitable for the depth range information signaling on the basis of the signaling.

The left mixer 1040 mixes a left graphic.

The right mixer 1050 mixes a right graphic.

The 3D output formatter 1060 performs processing for outputting a 3D image.

Figure 2:
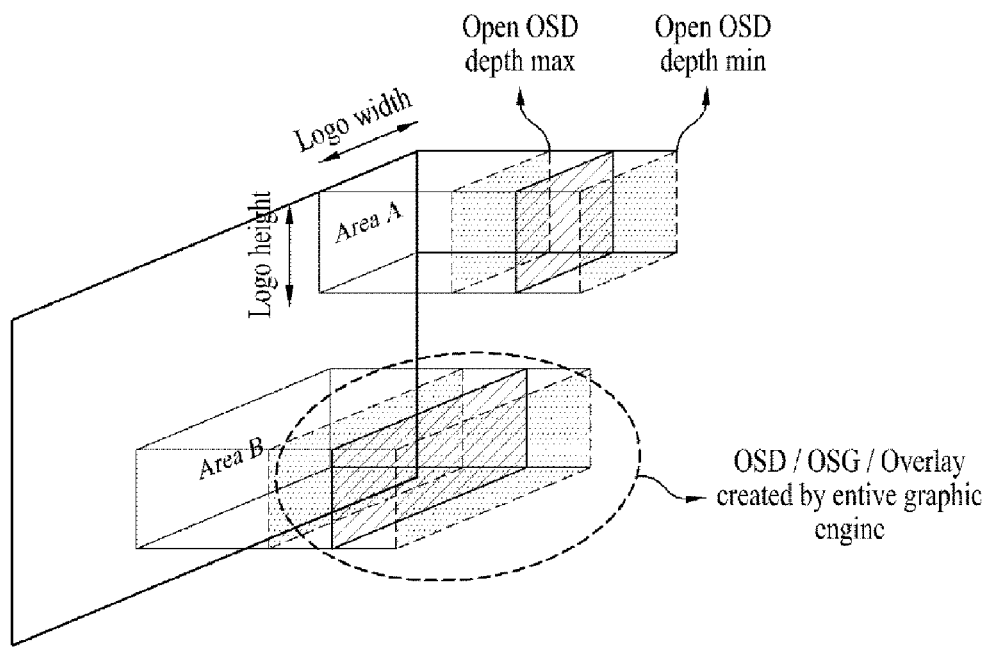
FIG. 2 illustrates an OSD output method in a receiver according to an embodiment of the present invention.

FIG. 2 illustrates an OSD output method in a receiver according to an embodiment of the present invention.

An open OSD can be defined as an overlay transmitted being embedded in a video. A native OSD can be defined as an OSD generated in the broadcast receiver. A depth at which the native OSD is displayed can be determined by a disparity range of 3D broadcast service/content. Furthermore, the native OSD can be displayed by taking into account a disparity range in which the open OSD can be displayed.

That is, an embedded overlay displayed in area A may have a disparity range different from that of the 3D broadcast service/content and, if there is an OSD that needs to be displayed over area A, it is possible to take into account the disparity range of area A in addition to the disparity range of the 3D broadcast service/content. In other words, each the area A, area B and other areas in the 3D video frame can have extremely different range of disparity. In this case, when an OSD or graphic data displayed by the receiver should be displayed on both of area A and other areas, the receiver may consider both the range of disparity for area A and the range of disparity for other areas.

To achieve this, the following information can be included in signaling information.

When the open OSD is not considered, video disparity range (minimum disparity/maximum disparity) information that represents the disparity range of the 3D broadcast service/content may be included in the signaling information.

Information regarding the open OSD may be included in the signaling information. In this case, it is possible to signal a plurality of open OSDs by designating as many for loops as the number of open OSDs. The information relating to the open OSD may include the following information.

An open overlay disparity range that represents the disparity range of an embedded overlay may be included in the open OSD associated information. The open overlay disparity range may include information about a minimum disparity value and/or a maximum disparity value of the open overlay. That is, the open overlay disparity range may include only the minimum disparity value of the open overlay as necessary.

The open overlay disparity range information may be modified such that it includes only information representing whether the corresponding open overlay is displayed in a 2D (flat) mode or a 3D (volumetric) mode.

The information about the open OSD may include an open overlay type that indicates the type of the open overlay. For example, the type of the open overlay can correspond to a broadcasting station logo, a sports game score, an entertainment program caption, a program guide caption, or an emergency broadcast message.

When multiple open overlays are present, the information about the open OSD may include open overlay priority information that represents the priority of the multiple open overlays. The open overlay priority information may include information representing whether a native OSD is allowed to be overlaid on an open overlay. For example, if the open overlay priority information has a priority value smaller than a specific value, the open overlay priority information represents that the native overlay is allowed to be overlaid on the corresponding open overlay. This function may be executed using the open overlay type field only as necessary. For example, it is possible to assign a high priority value to an emergency broadcasting message and set the native OSD such that the native OSD does not cover the open overlay when the open overlay type indicates that the open overlay corresponds to the emergency broadcasting message.

The information relating to the open OSD may include open overlay area information that represents (x, y) coordinate values and/or the width, height, and box size of the area in which the open overlay is present.

The open overlay area information may indicate an index number of a specific area from among areas designated in the overall image.

The information relating to the open OSD may include 2D extraction method information that represents whether or not a 3D video image to be displayed as a background when the native OSD is floated can be switched to a 2D image. That is, when the native OSD is displayed, a case in which the 3D effect needs not be maintained may be generated because viewers generally have no interest in the 3D video image. Accordingly, the 3D video image can be displayed as a 2D video image without being subjected to 3D rendering. The 2D extraction method information may be included in a component descriptor. The 2D extraction method information may be included separately in a component level descriptor of the 3D video. However, the location of the 2D extraction method information is not limited thereto. The 2D extraction method information may include information representing an option of displaying only the left-view image constituting the 3D video image as a background, displaying only the right-view image constituting the 3D video image as the background, selectively displaying the left-view image and the right-view image, displaying an image transmitted through a different stream, or maintaining the displayed 3D video image, when the native OSD is displayed.

The information relating to the open OSD may include information representing whether to include a floating window in the edge of the screen, which affects the 3D effect and/or location information of the floating window.

The information relating to the open OSD may be transmitted through system-level signaling or video-level signaling.

In case of system-level signaling of a 3D mode, the information relating to the open OSD can be transmitted through video depth range descriptor extension. Otherwise, the information relating to the open OSD can be transmitted by defining a new descriptor.

In case of video-level signaling of the 3D mode, the information relating to the open OSD can be transmitted through supplemental enhancement information (SEI) message extension. Otherwise, the information relating to the open OSD can be transmitted by defining a new SEI message.

FIG. 3 shows an extended video depth range descriptor when a 3D mode is signaled at a system level according to an embodiment of the present invention.

The extended video depth range descriptor carries depth range information of 3D video and the main object thereof is to signal information that can be referred to when various OSDs are output along with a 3D video stream such that depths of the OSDs and the 3D video stream do not overlap. According to an embodiment of the present invention, range_type can be extended to include the information relating to the open OSD in order to separately signal depth range information relating to the oven overlay.

FIG. 4 shows a range_type field and a production_disparity_hint_info field according to an embodiment of the present invention.

When the range_type field has a value of 0x01, it represents that the display range value for the open overlay can be signaled through the video depth range descriptor. In this case, it is possible to signal information about multiple open overlays through as many for loops as the number of open overlays. If the depth range of a specific area which does not correspond to an open overlay is considerably different from those of other areas, it is possible to exclude information applied to the specific area from disparity information of the corresponding video, to designate the specific area as an additional open overlay area and to separately signal disparity information of the additional open overlay area.

When the range_type field has a value of 0x00, the production_disparity_hint_info field can be used. The production_disparity_hint_info field can signal a maximum disparity value and/or a minimum disparity value on a 3D service, 3D content or 3D scene basis. The production_disparity_hint_info field may signal a maximum disparity value of a 3D picture or image.

FIG. 5 shows a video_with_open_overlay_disparity_info information according to an embodiment of the present invention.

When the range_type field has a value of 0x01, depth information for an open overlay can be signaled. In this case, depth information for a plurality of open overlays can be signaled through as many for loops as the number of open overlays. If the depth range of a specific area which does not correspond to an open overlay is considerably different from those of other areas, it is possible to exclude depth information of the specific area from disparity information of the corresponding video, to designate the specific area as an additional open overlay area and to separately signal the depth information of the additional open overlay area as necessary.

A disparity_for_video_only ( ) field may signal information similar to that signaled by the production_disparity_hint_info field. The disparity_for_video_only ( ) field can signal maximum and minimum disparity values of the video other than open overlays. Accordingly, the disparity_for_video_only ( ) field can include video_max_disparity and video_min_disparity values like the production_disparity_hint_info field. While these disparity values are based on a case in which the width of the video corresponds to 11520 pixels, a value other than the width of the video may be set as a reference value as necessary. In this case, the reference value can be additionally signaled.

A 2D_extraction_method field can provide information representing whether a 3D image surrounding an OSD is switched to a 2D image when the receiver floats the OSD. Accordingly, the receiver can refer to this information when switching a background image of a native graphic to a 2D image. It is possible to switch a 3D video to a 2D image when a graphic image is floated while the 3D video is being viewed as necessary. The 2D_extraction_method field can indicate switch to a 2D image. The 2D_extraction_method field can represent display of a background image using a left-view image as a 2D image. The 2D_extraction_method field can indicate display of the background image using a right-view image as a 2D image. When an OSD is displayed, the 2D_extraction_method field can represent that a specific method for processing a background image is not present. The 2D_extraction_method field can represent that there is no need to switch the background image to a 2D image even when the OSD is displayed. The 2D_extraction_method field can represent that the background image can be retrieved from a different stream when the OSD is displayed. That is, the 2D_extraction_method field can represent display of data of an additional broadcast stream that transmits the background image. Information relating to the 2D_extraction_method field may be sent in a field format or signaled in a field of a descriptor attached to each elementary stream, such as a component descriptor.

A floating_window_present field may include information that signals whether floating window (FW) processing has been performed on the video. Here, the FW may be a vacant area corresponding to part of the edge of a displayed image to reduce 3D effect distortion occurring at the edge of a display panel. The floating_window_present field can signal information representing that FW processing has not been performed on the video, information representing that FW processing has been performed on the video or information representing that whether FW processing has been carried out on the video cannot be recognized. The receiver can adjust an OSD position with reference to this information when floating a native OSD. Detailed information about an FW-processed area may be included in this video_with_open_overlay_disparity_info information or signaled through a separate descriptor.

An open_overlay_type field represents the type of the corresponding open overlay. For example, a broadcasting station logo, a sports game score, an entertainment program caption, a program guide caption, or an emergency broadcasting message can be displayed as an open overlay and the open_overlay_type field can represent the type of the open overlay. According to an embodiment, when the open_overlay_type field indicates that the corresponding open overlay corresponds to an emergency broadcasting message, the receiver can adjust the open overlay such that the open overlay is not covered with a native OSD using the open_overlay_type field.

An open_overlay_priority field represents priority of an open overlay. If the open_overlay_priority field is '0', the open_overlay_priority field signals that a native OSD is not allowed to be overlaid on the open overlay because the open overlay has high priority. If the open_overlay_priority field is '1', the open_overlay_priority field represents that the native OSD is allowed to be overlaid on the open overlay because the open overlay has low priority. Alternatively, values of 0, 1, 2, 3, . . . are allocated to all overlays described in the video to represent that a smaller value indicates lower priority. Some functions of the open_overlay_priority field can be executed by the open_overlay_type field.

A disparity_for_open_overlay ( ) information includes disparity range information of the corresponding open overlay. When max_disparity and min_disparity values are equal to each other, the corresponding overlay may be a flat image. In this case, the same value may be a depth offset at which the flat open image is located. While the disparity_for_open_overlay ( ) information executes a function similar to that of the production disparity hint info ( ), the disparity_for_open_overlay ( ) information is distinguished from the production disparity hint info ( ) in that it signals maximum and minimum disparity values of the corresponding open overlay. The disparity_for_open_overlay ( ) information may include the max_disparity and min_disparity values. The disparity_for_open_overlay ( ) information may indicate only a minimum disparity value of a specific area. The disparity values are based on a case in which the horizontal size of the video corresponds to 11520 pixels. A value other than the horizontal size may be set to a reference value as necessary. In this case, the set reference value may be separately signaled.

FIG. 6 shows an open_overlay_area_info ( ) information according to an embodiment of the present invention.

The open_overlay_area_info ( ) information can indicate area information of an open overlay. An embodiment of signaling information includes a method of providing box area information on a pixel basis, which can transmit x and y coordinate values of the leftmost pixel located at the top of a box, a box width and a box height of the box on a pixel basis. Otherwise, a virtual grid may be provided to a video and x and y indexes of the grid including an area and/or width and height values of the area may be transmitted. This method can be signaled through a grid_type field. A grid is a unit of division of the overall screen into regions having a specific size.

The grid_type field may include information representing a grid type. If the grid_type field has a value of '0', the grid_type field represents that a pixel based grid can be defined. If the grid_type field has a value of '1', it means a separately defined grid unit. The grid may be defined as a group of pixels. In this case, areas obtained by dividing one image can be defined as one grid.

In an embodiment of the present invention, when the grid_type field is '0', a grid_x field included in the open_overlay_area_info ( ) information corresponds to an x coordinate value of the leftmost pixel at the top of the corresponding area, which may be represented on a pixel basis. A grid_y field corresponds to a y coordinate value of the leftmost pixel at the top of the corresponding area, which may be represented on a pixel basis. A grid_width field refers to a width value of a box representing the area, represented on a pixel basis. A grid_height field refers to a height value of the box, represented on a pixel basis.

In an embodiment of the present invention, when the grid_type field is '1', a grid_num_horizontal_pixels field included in the open_overlay_area_info ( ) information can indicate the number of grid nodes in the horizontal axis direction of the video. If the grid_num_horizontal_pixels field has a value of '2', it represents that one image includes two areas in the horizontal axis direction. A grid_num_vertical_pixels field may indicate the number of grid nodes in the vertical axis direction of the video. If the grid_num_vertical_pixels field has a value of '2', it represents that one image includes two areas in the vertical axis direction. A ref_resolution_width field may refer to a width value of ref_resolution used as a reference when the grid is designated. Since the resolution of the video corresponds to a multiple of 16 pixels, the ref_resolution_width field can be represented as a multiple of 16 so as to reduce the number of bits representing the field. A ref_resolution_height field may refer to a height value of the ref_resolution used as a reference when the grid is designated. Since the resolution of the video corresponds to a multiple of 16 pixels, the ref_resolution_height field can be represented as a multiple of 16 so as to reduce the number of bits representing the field. The grid_x field refers to an x coordinate value of the leftmost pixel at the top of the corresponding area, which is represented in the unit of grid. When the grid_x field has a value of 'k', the grid_x field is calculated as ref_resolution_width/A*k when it is converted into a pixel unit. Here, A denotes the value of the grid_num_horizontal_pixels field. The grid_y field refers to a y coordinate value of the leftmost pixel at the top of the corresponding area, which is represented in the unit of grid. When the grid_y field has a value of 'm', the grid_y field is calculated as ref_resolution_height/B*m when it is converted into a pixel unit. Here, B denotes the value of the grid_num_vertical_pixels field. The grid_width field refers to a width value of the box representing the area and may be represented on a grid basis. The grid_height field refers to a height value of the box and may be represented on a grid basis.

A grid_base_view_flag field represents whether the area is defined on the basis of left-view or right-view. In an embodiment of the present invention, the grid_base_view_flag field represents that an overlay area is defined on the basis of left-view when it is '0' and indicates that the overlay area is defined on the basis of right-view when it is '1'.

Fields included in the open_overlay_area_info ( ) information may be omitted or may be integrated such that one field represents information of other fields.

FIG. 7 shows a virtual channel table (VCT) according to an embodiment of the present invention.

Definition of each field included in the VCT can be inferred from the related arts.

The aforementioned extended video depth range descriptor can be defined in a position indicated in FIG. 7. In this case, the extended video depth range descriptor can be considered to be defined at a channel level.

FIG. 8 shows an event information table (EIT) according to an embodiment of the present invention.

Definition of each field included in the EIT can be inferred from the related arts.

The aforementioned extended video depth range descriptor can be defined in a position indicated in FIG. 8. In this case, the extended video depth range descriptor can be considered to be defined at an event level.

Figures 9, 10:
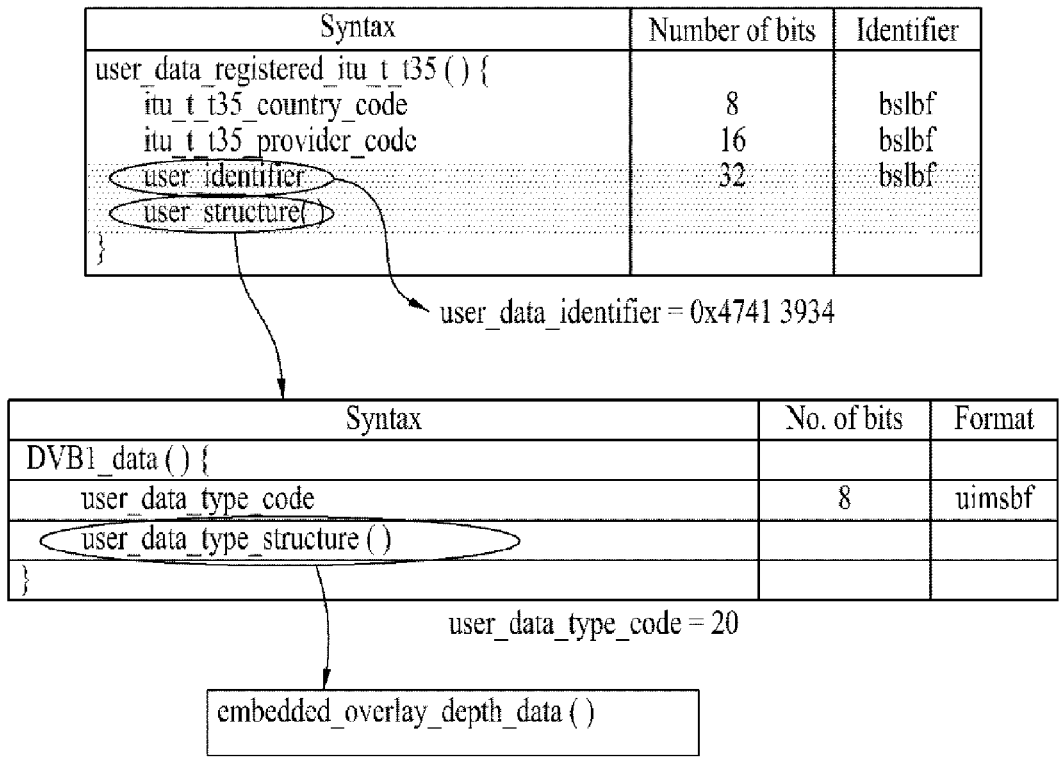
FIG. 9 illustrates information signaling for an embedded overlay using a SEI message according to an embodiment of the present invention.
FIG. 10 shows an embedded_overlay_data descriptor according to an embodiment of the present invention.

FIG. 9 illustrates information signaling for an embedded overlay using a SEI message according to an embodiment of the present invention.

Depth information and/or location information about an embedded overlay can be signaled at a video level. In this case, signaling can be performed using a SEI message.

Embedded_overlay_depth_data including signaling information about the embedded overlay is parsed as follows.

EH_data ( ) is received through a SEI raw byte sequence payload (RBSP). EH_data ( ) may be included in a video element stream. An advanced video coding (AVC) network abstraction layer (NAL) unit is parsed. If a nal_unit_type value obtained from the parsing is 6, EH_data ( ) corresponds to SEI data. A user_data_registered_itu_t_t35 SEI message having a pyloadtype of 4 is read to check a user_identifier value. User_structure ( ) having a user_identifier value corresponding to 0x4741 3934 is read to extract data having user_data_type_code of 0x20. The receiver acquires depth information about a graphic overlay included in the current video stream by decoding embedded_overlay_depth_data ( ). This depth information can be used to discriminate the depth range of the actual video from the depth range of the graphic overlay and to determine a display position of a native graphic (e.g. OSD) taking into account the range of the actual video from which an embedded graphic element has been excluded when the receiver displays the native graphic.

FIG. 10 shows an embedded_overlay_depth_data descriptor according to an embodiment of the present invention.

Fields or descriptors included in the embedded_overlay_depth_data descriptor, which have the same names as those of fields or descriptors included in the above-mentioned video_width_open_overlay_disparity_info descriptor, may execute the same functions as those of the corresponding fields or descriptors included in the video_width_open_overlay_disparity_info descriptor.

In case of video-level signaling, only basic information may be transmitted in order to minimize the quantity of signaled information because information should be transmitted for each frame.

For example, if location information about an embedded overlay and video depth range information when the embedded overlay is excluded are known, it is possible to float a native OSD in a position other than the position of the embedded overlay. Accordingly, only information of disparity_for_video_only ( ) and open_overlay_area_info ( ) for the embedded overlay may be signaled. In this case, a 1-bit flag for indicating whether the information is included may be added. For example, it is possible to signal whether disparity_for_video_only ( ) is included according to disparity_for_video_only_flag.

Figure 11:
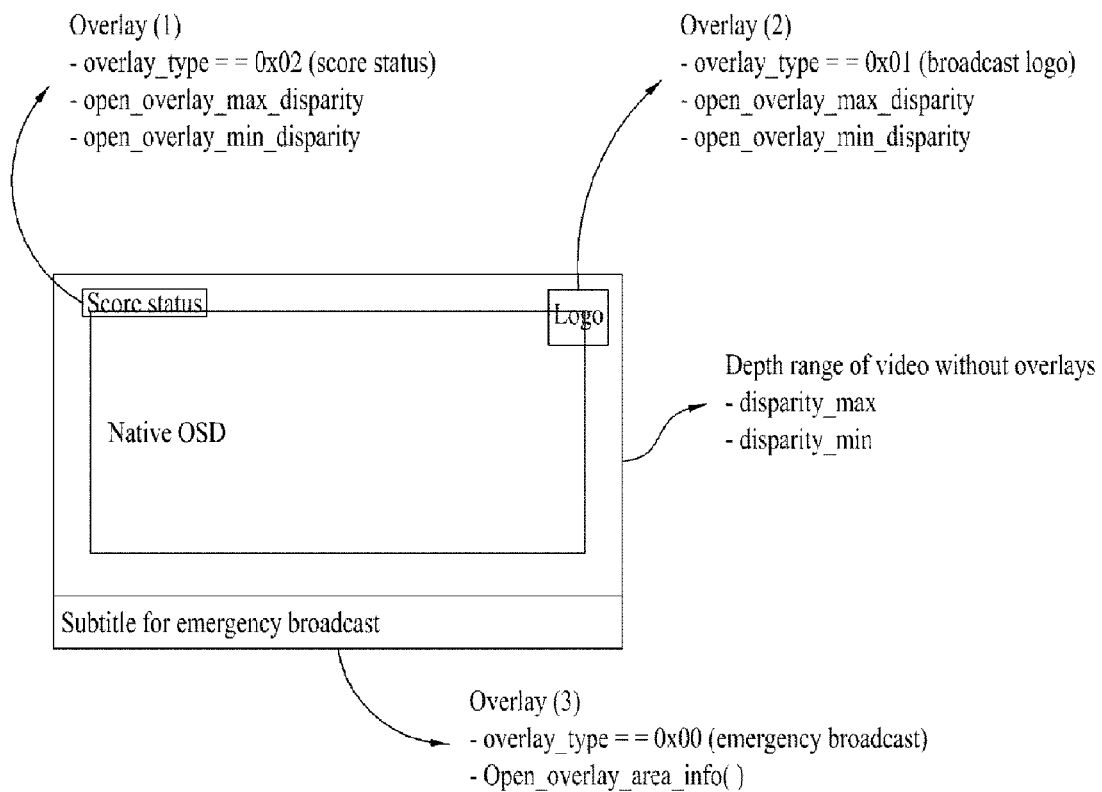
FIG. 11 illustrates an operation of a receiver to display a native OSD in consideration of embedded overlays according to an embodiment of the present invention.

FIG. 11 illustrates an operation of a receiver to display a native OSD in consideration of embedded overlays according to an embodiment of the present invention.

The following two methods can be considered as methods for, at the receiver, obtaining a depth range for an embedded overlay. In a first embodiment, the receiver can receive a video depth range value through a video depth range descriptor included in a service description table (SDT)/EIT of DVB SI. If detailed information about an embedded overlay is provided, the receiver can receive all the above-mentioned information. In a second embodiment, the receiver can receive the video depth range value through a video depth range descriptor of a video header.

If the aforementioned range_type has a value of 0x00 and only information of production_disparity_hint can be used, the receiver can display the native OSD on the basis of production_disparity_hint_info only, which corresponds to depth range information of video. Even if a broadcasting station logo or a sports game score board included in the video occupies a small region of a corner of the screen, the receiver can display the native OSD such that the native OSD is located in front of positions corresponding to all minimum depth values.

When the aforementioned range_type has a value of 0x01 and information of 'video with open (embedded) overlay disparity hint' is used, the receiver can obtain depth range information of the video only except the overlay through video_max_disparity and video_min_disparity values included in disparity_for_video_only( ). The receiver can acquire depth range information for each of various embedded overlays included in the video through a field included in disparity_for_open_overlay ( ) in a loop in the descriptor, and obtain location information about the corresponding overlay through a field included in open_overlay_area_info ( ). In this case, the receiver may derive the information of production disparity hint info ( ) which is obtained when the range_type has a value of 0x00 using depth range information about the video and all the described overlays.

It is possible not to cover a high-priority embedded overlay (e.g. emergency broadcast) by the native OSD using open_overlay_type or open_overlay_priority field information.

For example, if a native OSD that is not overlaid on an emergency broadcasting caption is floated while 3D broadcast is viewed, the following procedure is needed. The receiver checks video depth range information when embedded overlays are excluded through the disparity_for_video_only( ) field. The receiver checks information about each overlay. Specifically, the receiver detects open_overlay_area_info( ) for a corresponding overlay if overlay_type information corresponds to 0x00 (e.g. a value indicating an emergency broadcasting caption) and detects disparity_for_open_overlay( ) for other overlay_type values. The receiver selects a depth position at which the native OSD will is floated on the basis of the detected disparity_for_video_only( ) and disparity_for_open_overlay( ). For example, if a disparity_min value of the video without embedded overlays is −3, a disparity_min value of overlay (1) is −4, and a disparity_min value of overlay (2) is −5, it is safe to select a position in front of the position corresponding to −5 as the depth position of the native OSD when the native OSD and an overlay overlap. If the native OSD and any embedded overlay do not overlap, a position in front of the position corresponding to −3 may be selected as the depth position of the native OSD. The receiver decides an area in which the native OSD will be located on the basis of the open_overlay_area_info( ) of an embedded overlay having top priority. For example, if area information of an emergency broadcasting caption corresponding to overlay (3) is grid_type==0, grid_x==0, grid_y==900, grid_width==1920, grid_height==180, the native OSD is located in an area other than the area corresponding to the area information.

The receiver can display the native OSD by taking into account the 2D_extraction_method field value. The receiver checks the video disparity range before floating the native OSD to detect a disparity area suitable to float the native OSD. Here, if the video disparity range is too wide or is not suitable to locate the native OSD for other reasons, a 3D image displayed as a background of the native OSD may be displayed as a 2D image. In this case, the receiver can determine whether it is necessary to switch the 3D image to the 2D image with reference to the 2D-extraction_method field value. For example, if the 2D_extraction_method field value is '000', a left image is extracted and used as the 2D image and the native OSD is displayed on the 2D image. The receiver switches the 2D image to the 3D image after display of the native OSD is ended.

The receiver can display the native OSD in consideration of a FW. The receiver detects a location suitable to float the native OSD by checking whether FW processing has been performed on the corresponding video. For example, if a floating_window_present field value is '01', which represents that FW processing has been performed, an OSD module can use this information to adjust the location of the native OSD. A region processed into a bar region of the FW can be identified in such a manner that the receiver extracts the region through image analysis or extracts detailed information about the FW through signaling using PSI/PSIP/SI or the video header. Based on this information, it is possible to process the location of the native OSD such that the native OSD is not displayed on the boundary of the bar region of the FW and the video area, to float the native OSD in the bar region of the FW, or to locate the native OSD in the video area only.

FIG. 12 shows a 3D_scene_depth_info_descriptor according to an embodiment of the present invention.

The receiver can display the native OSD according to depth range information that varies with scenes. Video-level signaling can meet a variation on a frame basis because information is transmitted for each frame. In case of system-level signaling, it is possible to transmit depth range information on a program/channel/service basis or an event basis. Accordingly, a scheme of adding scene unit information to depth range information and transmitting the information can be considered for detailed information transmission according to time. The 3D_scene_depth_info_descriptor can be located at a service level of SDT, a channel level of TVCT, a program or ES level of PMT, or an event level of EIT.

In embodiments of the present invention, while a scene may be a context based segment, the scene is basically a time segment defined by a start time and duration. That is, in case of signaling through PMT, VCT or EIT as in the present embodiment, the scene is defined by an absolute start time and duration without correlation with a program or event. This is similar to the concept of signaling an event through the EIT by 3 hours on the basis of the current time. Consequently, scenes may have different programs or events even if they are classified as the same scene. If scene segmentation based on video content or context is performed, scene_format_type is set to "11" and information about each section can be transmitted. In the case that depth information cannot be known, such as live broadcast, both min_disparity and max_disparity values can be set to 0.

A number_of_scenes field represents the number of scenes whose depth information can be detected through the currently transmitted 3D scene-level depth information descriptor.

A first_scene_start_time field indicates a base time for scenes signaled through the 3D_scene_depth_info_descriptor. The first_scene_start_time field means the start time of the first scene, is represented in the unit of hour, and has a value in the range of ( ) to 23. That is, the first_scene_start_time field represents a base time for time information about each scene, which is signaled through a scene_id field, a scene_start_time field, etc.

The scene_start_time field means the start time of each scene. A start time can be represented by various methods. The start time can be represented in GPS seconds on the basis of 00:00 on the sixth of January in 1980 (in this case, 32 bits are needed), or represented in seconds on the basis of the first_scene_start_time. For example, when the 3D_scene_depth_info_descriptor is received at 7:30, 7:40 is represented as 2400 seconds if the first_scene_start_time has a value of 7 and 2400 seconds are used as the scene_start_time value.

The scene_id field is an identifier of each scene and can implicitly signal the start time of each scene when the scene_start_time field is not present. The scene_id field starts from 0, and a correct time of application of this field to the time span of a scene is recognized using the first_scene_start_time field.

FIG. 13 shows definition of the scene_format_type field and a scene_disparity_info information according to an embodiment of the present invention.

When the receiver needs to overlay a menu or graphic data on a 3D video at an arbitrary time, depth collision among an object, graphic, menu, icon, etc. of the 3D video can be prevented if a min_disparity value of the time is known. For example, when scene_format_type="10", the receiver is aware of the time when depth information is applied using the scene_id field. A 3D scene-level depth information descriptor provides 3D video depth range information about each scene. A scene duration can be fixed in the same descriptor or the same PMT/TVCT/EIT section instance. That is, all scenes may have the same duration. The duration of each scene is defined by a scene_duration field. That is, the 3D scene-level depth information descriptor provides 3D video depth range information on a time basis specified by the scene_duration field. For example, when scene_duration=1200 (20 minutes), scene_id=( ) means a time segment corresponding to 20 minutes starting from the time specified by the first_scene_start_time field. Here, when the first_scene_start_time corresponds to 19 and the receiver attempts to display an OSD at 7:30 pm, information corresponding to scene_id=11 is used to determine an appropriate depth range. When scene_format_type="11", each scene is definitely defined such that it has a duration corresponding to the scene_duration field from the time specified by the scene_start_time field. In this case, scenes may have different durations even if they are in the same descriptor. When the receiver displays an OSD at a specific time while playing the 3D video, the receivers detects a scene corresponding to the current time and uses depth range information corresponding to the scene.

Fields included in a scene_disparity_info information have the same functions as those of corresponding fields included in the above-described informations so that detailed explanations thereof are omitted.

Figure 14:
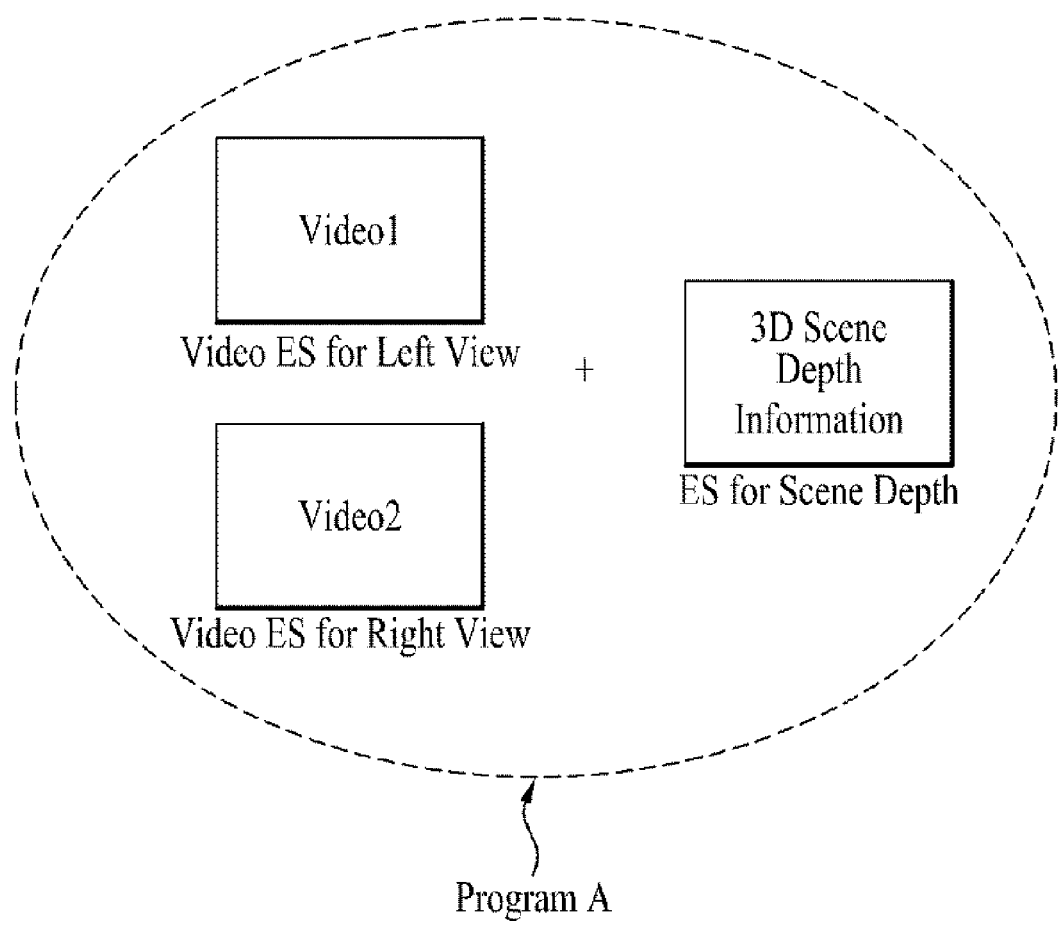
FIG. 14 illustrates a configuration of a program for transmitting depth information for an embedded overlay according to an embodiment of the present invention.

FIG. 14 illustrates a configuration of a program for transmitting depth information for an embedded overlay according to an embodiment of the present invention.

The contents of the aforementioned descriptors may be configured as separate streams, as shown in FIG. 14, and transmitted. In this case, signaling of the streams needs to be performed through PMT, SDT, EIT, TVCT, etc. and stream_type, component_type and stream_content fields may be used to designate the corresponding streams.

Figure 15:
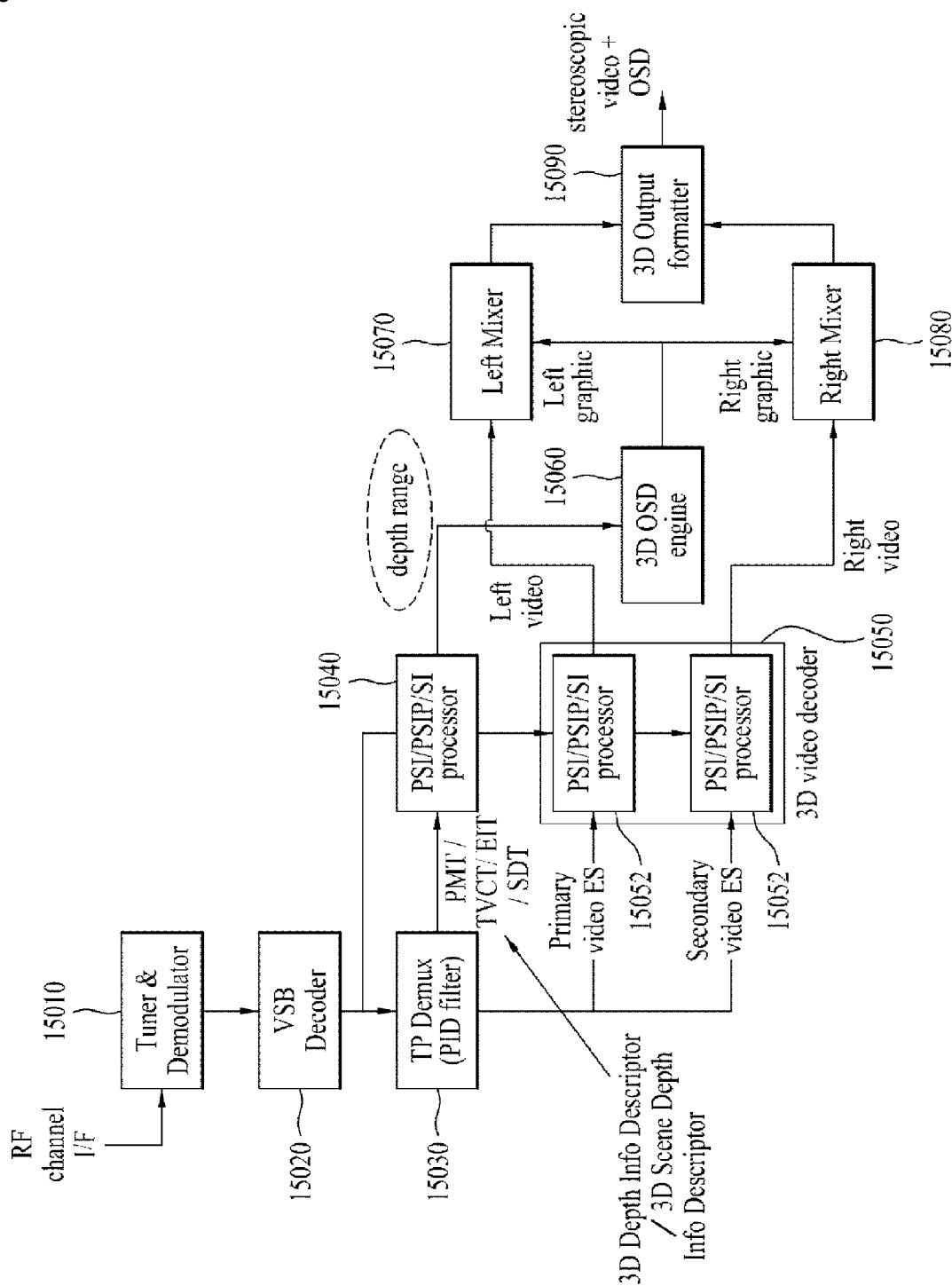
FIG. 15 shows functional blocks of a receiver according to an embodiment of the present invention.

FIG. 15 shows functional blocks of a receiver according to an embodiment of the present invention.

The receiver according to an embodiment of the present invention may include a tuner and demodulator 15010, a VSB decoder 15020, a transport packet demultiplexer 15030, a PSI/PSIP/SI processor 15040, a 3D video decoder 15050, a primary video decoder 15052, a secondary video decoder 15054, a 3D OSD engine 15060, a left mixer 15070, a right mixer 15080, and/or a 3D output formatter 15090.

The tuner and demodulator 15010 tunes to a 3D broadcast channel and demodulates a received signal.

The VSB decoder 15020 decodes a signal to which VSB has been applied. The VSB decoder 15020 may be regarded as a block for decoding a signal to which OFDM has been applied while it is called a VSB decoder.

The transport packet demultiplexer 15030 separates a transport packet from a broadcast signal. Particularly, the transport packet demultiplexer 15030 filters a packet identifier.

The PSI/PSIP/SI processor 15040 processes a signaling signal. For example, the PSI/PSIP/SI processor 15040 processes tables included in PSIP or DVB SI or processes a signaling packet, a signaling segment, etc. The PSI/PSIP/SI processor 15040 may process information about the aforementioned embedded overlay.

The 3D video decoder 15050 includes the primary video decoder 15052 and/or the secondary video decoder 15054.

The 3D video decoder 15050 decodes 3D video data.

The primary video decoder 15052 decodes primary video data. For example, when video data has been subjected to multiview video coding (MVC), primary video data may be a base or enhanced layer signal. Otherwise, the primary video decoder 15052 may decode left video data.

The secondary video decoder 15054 decodes secondary video data. For example, MVC is applied to video data, secondary video data may be an enhanced or base layer signal. Otherwise, the secondary video decoder 15054 may decode right video data.

The 3D OSD engine 15060 performs processing to display an OSD. For example, the 3D OSD engine 15060 analyzes 3D depth information to determine a depth at which the OSD on a specific service, program, event and/or scene basis is displayed and to control display of the OSD. The 3D OSD engine 15060 can use the aforementioned information about the embedded overlay. The 3D OSD engine 15060 controls the OSD to be displayed in an appropriate position using the information about the embedded overlay.

The left mixer 15070 processes a left graphic constituting a 3D video image.

The right mixer 15080 processes a right graphic constituting the 3D video image.

The 3D output formatter 15090 displays the left graphic and right graphic constituting the 3D video image on the screen. The 3D output formatter 15090 may display an OSD along with the left graphic and right graphic.

The receiver can detect depth range information about a currently viewed program, channel and service on a scene basis or by the hours using the aforementioned 3D scene-level depth information descriptor included in the PMT, TVCT and/or SDT.

When the receiver receives the information about the embedded overlay through the EIT, the corresponding descriptor detects depth range information by the hours, which correspond to a time span of the EIT.

The receiver uses the above-mentioned video depth range information and/or the information about the embedded overlay when displaying a graphic and an OSD according to an interaction of the user, a message or an alarm function. The receiver determines a disparity at which the OSD is located using the min_disparity value such that the OSD is not overlaid on the 3D video image. In this case, the receiver may determine the disparity such that the disparity is located in front of a position corresponding to a value designated by the min_disparity value. Otherwise, the receiver may determine the disparity such that the OSD is not overlaid on a high-priority embedded overlay and the disparity is located in front of a position corresponding to a value designated by the min_disparity value in areas other than the area of the high-priority embedded overlay.

When the time when the OSD is displayed corresponds to a scene boundary, the receiver can display the OSD on the basis of one of min_disparity values of current and next scenes, which corresponds to a position in front (e.g. a smaller min_disparity value). For example, when an OSD display duration is assumed to be one minute in consideration of the timeout duration of the OSD and general user interaction, etc., it is possible to check if a scene change occurs between scenes within the one minute, to compare min_disparity values of the scenes with each other when the scene change occurs and to use only an appropriate min_disparity value to display the OSD.

Figure 16:
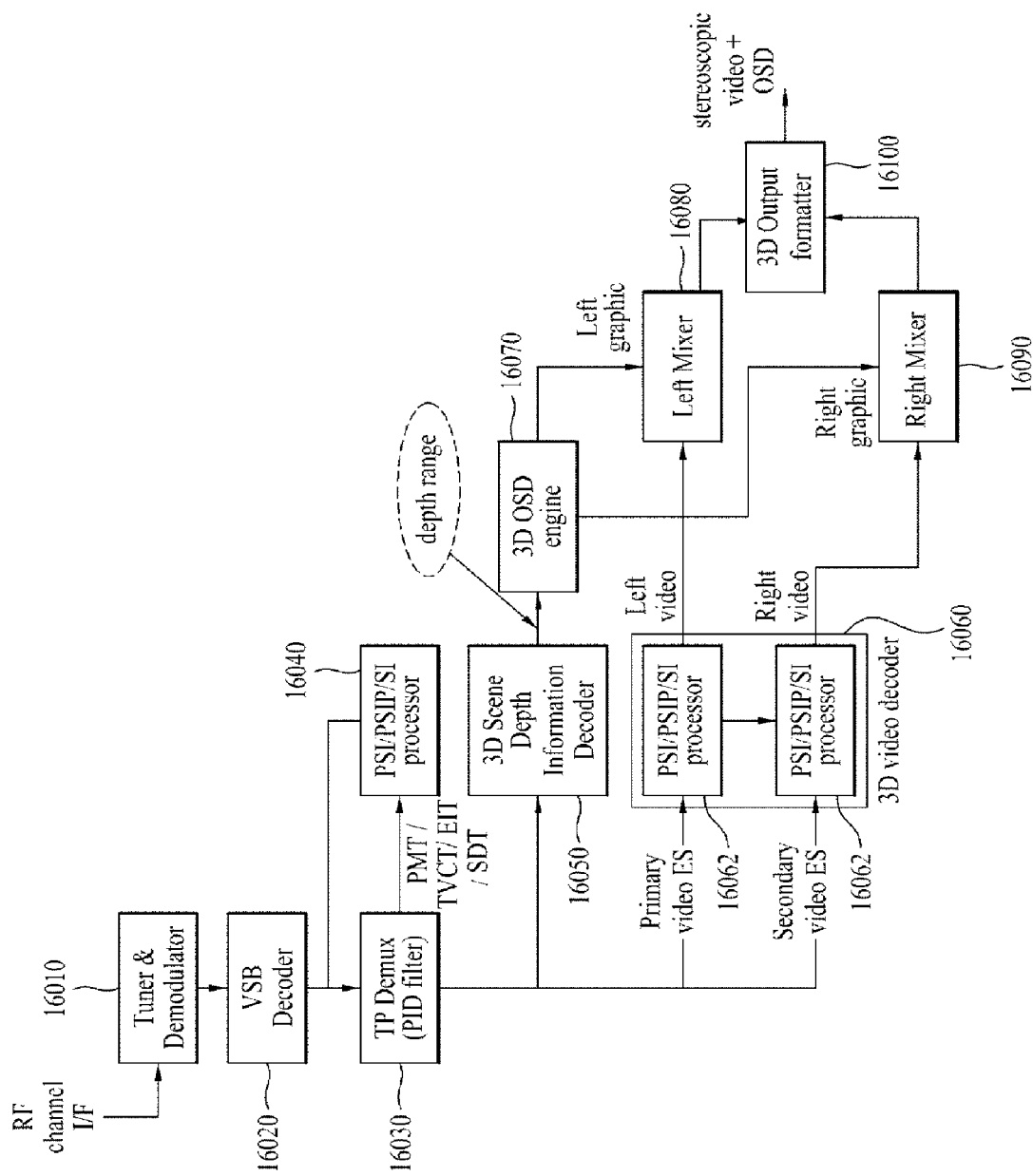
FIG. 16 shows functional blocks of a receiver according to another embodiment of the present invention.

FIG. 16 shows functional blocks of a receiver according to another embodiment of the present invention.

The receiver may include a tuner and demodulator 16010, a VSB decoder 16020, a transport packet demultiplexer 16030, a PSI/PSIP/SI processor 16040, a 3D scene depth information decoder 16050, a 3D video decoder 16060, a primary video decoder 16062, a secondary video decoder 16064, a 3D OSD engine 16070, a left mixer 16080, a right mixer 16090, and/or a 3D output formatter 16100.

Since functional blocks having the same names as those of the functional blocks shown in FIG. 15 execute the same functions as those of the blocks shown in FIG. 15, detailed explanations thereof are omitted.

The 3D scene depth information decoder 16050 decodes information about an embedded overlay. When the information about the embedded overlay is transmitted in PES, the 3D scene depth information decoder 16050 decodes the PES including the information about the embedded overlay. The decoder 16050 may process a SEI message including the information about the embedded overlay.

In this case, the aforementioned 3D depth range descriptor can be included in a PMT, TVCT, EIT and/or SDT and transmitted.

FIG. 17 shows a structure of a PES packet according to an embodiment of the present invention.

As described above, signaling for OSD display in a 3D video receiver may be defined in one or more layers. A first layer may provide depth range information about one area for each frame. In this case, depth range information for an event/service can be provided at an SI level. A second layer may provide depth range information about areas obtained by dividing one frame. Otherwise, it is possible to segment a 3D video into short durations such as scenes and provide depth range information corresponding to the corresponding duration. In this case, depth range information about each area or depth range information about each scene can be provided in a meta data format at a video level. For example, a SEI message can include the depth range information. Signaling in the first layer and signaling in the second layer may be independently provided or provided together.

A detailed description will be given of the second layer.

In regard to an information transmission method, information about an embedded overlay can be signaled through an individual section (e.g. a separated PES stream). Alternatively, the information about the embedded overlay can be included in a SEI message and transmitted.

When signaling is performed for each scene, information representing the start and/or end of a scene of each event/service may be transmitted.

When signaling is performed for each area, information about each area may be provided and depth range information considering a display object in each area may be signaled. Each area may be segmented into rectangular regions and identification information about each of the segmented regions is added to the depth range information about each area.

FIG. 17 is a syntax representing the structure of the PES packet. In the PES packet, depth_information_data( ) may include some or all the aforementioned embedded overlay related information. A PTS field may represent a base time for scenes that are signaled through the depth_information_data( ). That is, the PTS field can signal the start time of the first scene. Time information for scenes following the first scene can be signaled through an additional field. Values of these fields can be defined as valid values before updated. A scenario of signaling a PTS of an end time can be used.

FIG. 18 shows depth_inforamtion_data( ) according to an embodiment of the present invention.

A depth_update_flag field shall be set to '1' whenever the information carried in depth_information_data is changed or updated. The receiver can be relieved from the burden of parsing the same depth information. The receiver can decide whether or not to parse the depth information data depending on the value of this flag.

Event_min_disparity and event_max_disparity fields refer to the minimum and maximum disparity values in an event. Disparity refers to difference between the horizontal positions of a pixel in the left and right views that represents the same point in a pair of stereoscopic videos. Values event_min_disparity and event_max_disparity can be equal to video_min_disparity_hint and video_min_disparity_hint values in DVB video_depth_range_descriptor. A receiver having difficulty in implementing disparities (depths) subdivided on an area and scene basis can apply uniform depth information on an event basis using these fields.

A num_of_scenes field refers to the number of scenes whose depth information can be detected through currently transmitted depth_information_data( ).

A scene_id field corresponds to an identifier of each scene and may implicitly signal the start time when a scene_start_time field is not present. The scene_id field can be omitted as necessary.

The scene_start_time field refers to the start time of each scene. The start time can be represented by various methods. For example, the start time can be represented in GPS seconds on the basis of 00:00 on the sixth of January in 1980 (in this case, 32 bits are needed). Otherwise, the start time can be represented as a PTS offset on the basis of as start PTS value (a PTS value in the PES packet header ? the start time of the first scene) or represented in seconds.

A scene_duration field refers to the duration of a scene and may use a count value on the basis of 90 KHz. This field may be represented in GPS time unit.

Scene_min_disparity and scene_max_disparity fields refer to the minimum and maximum disparity values in a scene. They could be complete values or delta values relative to the disparity values of event_min_disparity and event_max_disparity. A receiver having difficulty in implementing disparities (depths) subdivided on an area basis can apply uniform depth information to all frames that belong to a scene using these fields.

FIG. 19 shows region_depth_data( ) according to an embodiment of the present invention.

Region_depth_data carries depth information about regions of frames included in a corresponding scene. At this time, depth information about some regions may be omitted as necessary and the receiver may apply scene_min_disparity/scene_max_disparity to regions corresponding to the omitted depth information. Furthermore, the receiver can apply scene region_min_disparity and scene region_max_disparity to neighbor regions (regions whose depth values are signaled). In this case, the receiver can implement the contents of the above fields. When a value that will be used needs to be designated through broadcast signaling, a field for this can be added. For example, a default_value_mode field is added. In this case, it is possible to set values such that a depth value of a scene is used when the default_value_mode field is '00, a depth value of a left region is used when the default_value_mode field is '01', an average of depth values of neighbor regions is used when the default_value_mode field is '10', and a maximum or minimum depth value of a neighbor region is used when the default_value_mode field is '11'.

A num_of_regions field refers to the number of regions.

A grid_base_view_flag field represents which one of L-view and R-view is used as a base for a defined region. The grid_base_view_flag field indicates that an overlay region is represented based on left-view when it is '0' and means that the overlay region is represented based on right-view when it is '1', or vice versa.

A grid_type field may refer to a pixel based grid when it is '0' and may represent a separately defined grid unit when it is '1'. That is, if the grid_type field is '1', a region can be composed of a group of pixels. In this case, an image may be segmented into regions through a specific method and the grid_type field may be set to each of the regions. If the grid_type field is '0', it is possible to use a method of basically applying a depth range on a scene/event basis and separately signaling a depth range of a specific region included in a stereoscopic 3D video image only when the depth range of the specific region is remarkably different from the depth range on a scene/event basis. Here, regions are defined such that they do not overlap.

A grid_num_hor_pixels field refers to the number of grid nodes in the horizontal axis direction of an image. The grid_num_hor_pixels field may represent the number of regions included in one frame in the horizontal axis direction.

A grid_num_ver_pixels field refers to the number of grid nodes in the vertical axis direction of the image. The grid_num_ver_pixels field may represent the number of regions included in one frame in the vertical axis direction.

A ref_resolution_width field refers to a width value of ref_resolution used as a base when a grid is designated. Since the resolution of the image corresponds to a multiple of 16 pixels, the ref_resolution_width field can be indicated as a multiple of 16 so as to reduce the number of bits representing the field.

A ref_resolution_height field refers to a height value of the ref_resolution used as a base when the grid is designated. Since the resolution of the image corresponds to a multiple of 16 pixels, the ref_resolution_height field can be indicated as a multiple of 16 so as to reduce the number of bits representing the field.

A region_id field identifies a region in a video frame. When the grid_type field is '1', the region_id field can be omitted if there is a rule of determining the order of regions, such as left to right or top to down.

A region_min_disparity and region_max_disparity fields refer to the minimum and maximum disparity values of a region.

A num_of_regions field can be set to be equal to a product of the grid_num_hor_pixels field and grid_num_ver_pixels field when the grid_type field is '1'. Here, coordinates of respective regions may be sequentially signaled without being separately transmitted.

An x_coordinate field refers to an x coordinate value of the leftmost pixel at the top of a region, which is represented in a pixel basis.

A y_coordinate field refers to a y coordinate value of the leftmost pixel at the top of the region, which is represented in a pixel basis.

A region_width field refers to a width value of a box that represents the region on a pixel basis. The value zero is used to signal a special region type.

A region_height field refers to a height value of the box that represents the region on a pixel basis. The value zero is used to signal a special region type.

FIG. 20 illustrates a method for providing depth information through a SEI message according to an embodiment of the present invention.

A user_identifier value of user_data_registered_itu_t_t35 ( ) identifies the type of user_structure ( ). When user_structure ( ) corresponds to DVB1_data ( ), the DVB1_data ( ) can include a user_data_type_code field and a user_data_type_structure ( ). The user_data_type_code field can identify the type of user_data_type_structure ( ) according to value thereof.

FIG. 21 shows depth_data ( ) according to an embodiment of the present invention.

When user_data_type_structure ( ) is identified as depth_data ( ), depth_data can include information about each region and/or depth information about each region.

Definitions of fields included in depth_data ( ) are replaced with the definitions of the aforementioned fields in the same names.

Scene_min_disparity/scene_max_disparity values are applied to frame including corresponding signaling information and can be continuously applied until new signaling (depth data) information is received.

The scene_min_disparity/scene_max_disparity values can maintain a signaled value until scene information is changed to new scene information. If a scene_end value is specified, the scene_min_disparity/scene_max_disparity values can be maintained until timing of scene_end is arrived.

Region based depth range information may be set such that it is included in the depth range of a frame or scene to which the corresponding region belongs.

Scene based depth range information may be set such that it is included in the depth range of an event to which the corresponding region belongs.

A change period of depth range signaling information is set to at least GOP unit. For example, if P(M) and P(N) are successive two IDR pictures (or I pictures) in a video sequence, the depth range signaling information cannot be changed in pictures arranged between P(M) and P(N), for example, P(M+1) to P(N−1).

Figure 22:
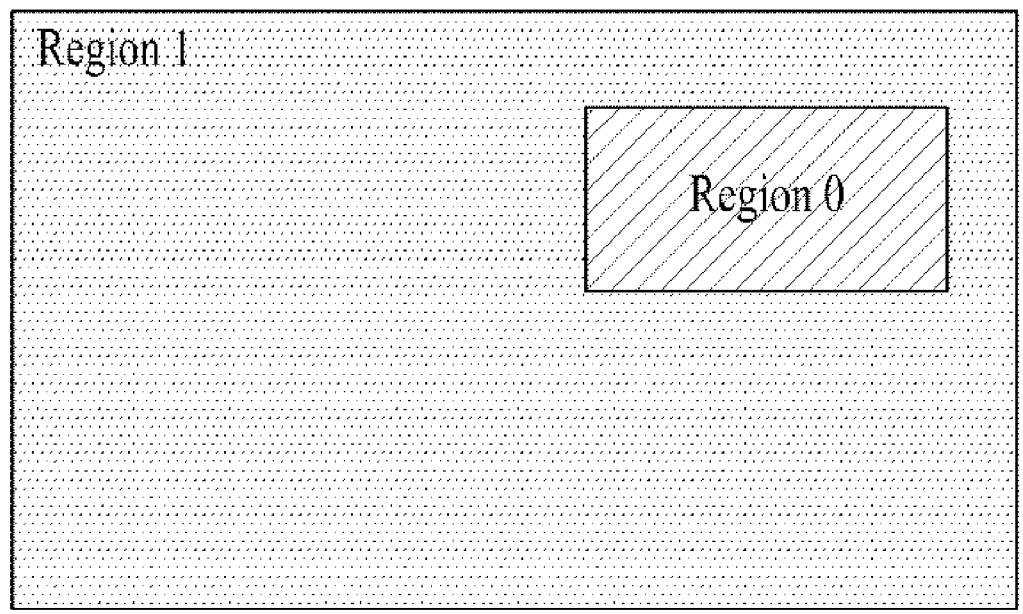
FIG. 22 shows a screen on which regions for region-based signaling are displayed according to an embodiment of the present invention.

FIG. 22 shows a screen on which regions for region-based signaling are displayed according to an embodiment of the present invention.

If two regions having different depth range properties are displayed on the screen, Region 0 and Region 1 are signaled as follows.

When grid_type is '0', for Region 0,
  x_coordinate=horizontal coordinate of left-most pixel belonging to Region 0;
  y_coordinate=vertical coordinate of top-most pixel belonging to Region 0;
  region_width=width of Region 0;
  region_height=height of Region 0;
  For Region 1,
  x_coordinate=set to 0xFFF; (to be ignored if region_width and region_height are 0)
  y_coordinate=set to 0xFFF; (to be ignored if region_width and region_height are 0)
  region_width=0;
  region_height=0;

If the values of region_width and region_height are both set to 0, the associated region will cover the remaining area which is not covered by other regions in the "num_of_regions" loop. There shall be at most one region for which region_width and region_height are set to 0 in the single instance of the depth_data or region_depth_data.

Figure 23:
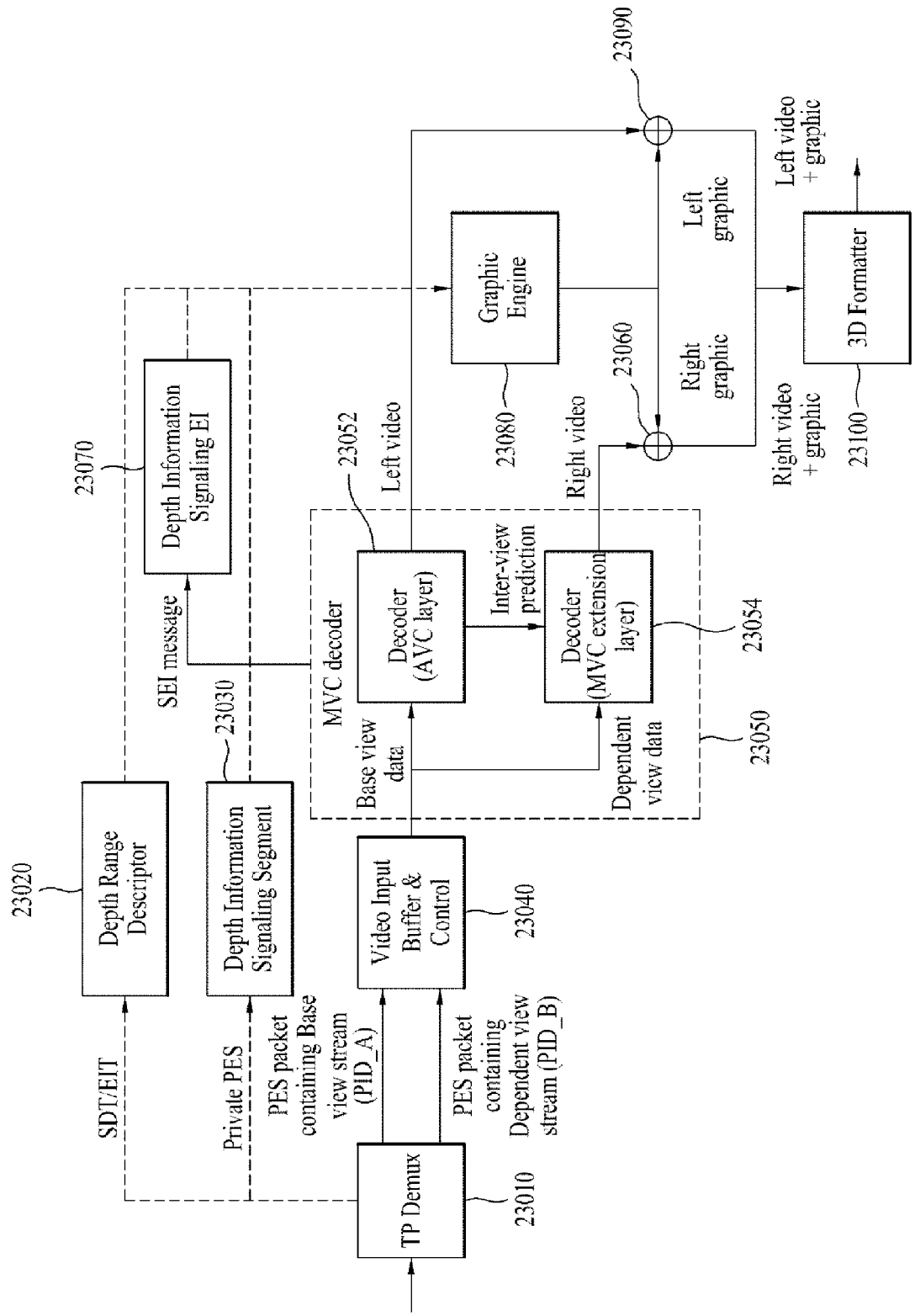
FIG. 23 shows functional blocks of a 3D receiver according to another embodiment of the present invention.

FIG. 23 shows functional blocks of a 3D receiver according to another embodiment of the present invention.

The 3D receiver may include a TP demultiplexer 23010, a depth range descriptor processor 23020, a depth information signaling information processor 23030, a video input buffer and control unit 23040, a video decoder 23050, a graphic video processor 13060, a depth information signaling SEI processor 23070, a graphic engine 23080, a left video processor 23090, and/or a 3D formatter 23100.

The RP demultiplexer 23010 receives data including a 3D video.

The depth range descriptor processor 23030 parses a descriptor including information relating to a depth range. Here, the descriptor including information relating to the depth range may be included in an SDT or EIT and transmitted.

The depth information signaling information processor 23030 parses a signaling segment including information about a depth, transmitted through private PES.

The video input buffer and control unit 23040 buffers a video input of a PES packet containing a base view stream and a PES packet containing a dependent view stream or controls output.

The video decoder 23050 decodes input video data. The video decoder 23050 may include an AVC layer decoder 23052 and/or an MVC extension layer decoder 23054. The AVC layer decoder 23052 decodes base view data and may transmit information for inter-view prediction to the MVC extension layer decoder 23054. The MVC extension layer decoder 23054 may decode dependent view data. The MVC extension layer decoder 23054 can use the information for inter-view prediction to decode the dependent view data.

The right video processor 23060 combines a right video and a right graphic. The right graphic may be an OSD displayed on the right video.

The depth information signaling SEI processor 23070 parses signaling information included in video data. For example, the depth information signaling SEI processor 23070 can parse the aforementioned information transmitted through the SEI message.

The graphic engine 13080 performs processing for displaying a graphic such as an OSD.

The left video processor 23090 combines a left video and a left graphic. The left graphic may be an OSD displayed on the left video.

The 3D formatter 23100 performs rendering for 3D image display.

Receivers may include receivers (referred to as 'type A receivers' hereinafter) having minimum capability for performing minimum part of the aforementioned features of the present invention, receivers (referred to as 'type B1 receivers' hereinafter) capable of performing some of the aforementioned features of the present invention, and receivers (referred to as 'type B1 receivers' hereinafter) having full capability capable of performing all the aforementioned features of the present invention.

Type A receivers include receivers which are unable to change or adjust graphic depth adaptively according to varying depth of underlying 3D video and/or receivers which are unable to apply different depth on a single graphic plane.

Upon the user request, type A receivers will place appropriate graphic element at the depth value specified by minimum disparity value in depth range descriptor (either in EIT or SDT). At the event boundary (in case different disparity value is signaled in EIT for successive events), the type A receiver may take into account the disparity value of the next event when displaying OSD. Final minimum disparity value will be a minimum value among disparity for the current event and disparity for the next event.

Type A receivers read depth (or disparity) information included in a depth range descriptor of an SDT/EIT from the depth range descriptor processing block 23020 and transmits the depth information to the graphic engine block 23080.

The graphic engine 23080 determines coordinate values of right video of OSD (graphic) data generated using the depth information. That is, if an existing 2D image is a left video, coordinate values of a left video of the OSD uses the coordinate values used to constitute the 2D image. As to the right video, the same graphic or a corresponding graphic to be displayed on the right video is displayed at coordinates moved by the depth (disparity).

Type B1 receivers can change depth of OSD elements adaptively from frame to frame and also can place multiple OSD elements with different depth values on the same frame.

Upon user request, Type B1 receivers will prepare appropriate graphic element with appropriate location. Type B1 receivers will decide the disparity value for the graphic element to display by matching the corresponding area and timing (scene) from the above described disparity signaling information. Type B1 receivers may adjust the placement of already displayed graphic element if the disparity value for the region where this OSD is located is changed according to the above described disparity signaling information.

Type B2 receivers may not fully apply the disparity value signaling specified in the above described disparity signaling information. Upon user request, Type B2 receivers will prepare appropriate graphic element with appropriate location. Type B2 receivers places the graphic element at the value specified as disparity for the entire frame in the above described disparity signaling information (however, temporal adjustment is possible). The receiver places the graphic element at the value specified as disparity for the event in the above described disparity signaling information (spatial adjustment is possible).

Type B1 receivers read disparity information included in a depth information segment (PES stream) or depth information signaling SEI. When the receivers have read the disparity information, the receivers uses the stored disparity information if the depth_update_flag field is '0' and reads new disparity information included in the depth information segment (PES stream) or depth information signaling SEI if the depth_update_flag field is '1'. The above-mentioned disparity information includes depth information subdivided on a scene and region basis. The read disparity information is transmitted to the graphic engine. The graphic engine matches user request, coordinates at which a graphic (OSD) will be output for the purpose of transmitting other information and information corresponding to the output time from the transmitted disparity information. A disparity value of the corresponding graphic image is determined using the matched information. The coordinates of a graphic image to be displayed on the left video use the same value as the location of the 2D image. Coordinates of a graphic image to be displayed on the right video correspond to a location moved by coordinates corresponding to the disparity value.

The above-mentioned left video and right video may be changed. A method of uniformly shifting the left video and right video can be used when disparity is applied. That is, coordinates of graphic output to the left video is shifted to the left by disparity/2 from the coordinates of the 2D image whereas coordinates of graphic output to the right video is shifted to the right by disparity/2 from the coordinates of the 2D image. A difference between output coordinates of graphic data corresponding to the left video and right video is equal to the disparity value irrespective of the scheme of implementing the left video and right video.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR THE INVENTION

Various embodiments have been described in the best mode for carrying out the invention.

INDUSTRIAL APPLICABILITY

As described above, the present invention is partially or wholly applied to a digital broadcast system.

The invention claimed is:
1. An apparatus for receiving a broadcast signal including 3-dimensional (3D) content, the apparatus comprising:
a receiving unit configured to receive a broadcast signal including video data for 3D content;
a decoder configured to decode the video data for the 3D content from the received broadcast signal;
a signaling processor configured to parse depth information from the decoded video data;

a graphic engine configured to determine a depth for displaying an on screen display (OSD) of a receiver;

a formatter configured to form images including the OSD located at the depth for the 3D content; and a display unit configured to display the images, wherein the depth information includes partition information indicating partitioning pattern of an image, several regions of the image being defined by the partition information, wherein the depth information further includes maximum disparity information specifying a maximum disparity value in the image and minimum disparity information specifying a minimum disparity value in a region of the several regions, and wherein the depth information further indicates whether to switch the 3D content to 2-dimensional (2D) content while the OSD is overlaid onto the 3D content.

2. The apparatus of claim 1, wherein the depth information further includes region identification information identifying the region of the several regions.

3. The apparatus of claim 1, wherein the depth information further includes number information indicating the number of regions in horizontal axis or vertical axis of the image.

4. The apparatus of claim 1, wherein the depth information is included in a SEI massage.

5. The apparatus of claim 2, wherein the depth information further includes priority information specifying priority for displaying of the region identified by the region identification information.

6. The apparatus of claim 5, wherein the graphic engine is further configured to determine the OSD not to overlay the 3D content of the region when a value of the priority information exceeds a threshold value.

7. A method for transmitting a broadcast signal including 3D content at a transmitter, the method comprising:

encoding depth information;

encoding video data including the depth information for 3D content; and transmitting a broadcast signal including the video data, wherein the depth information includes partition information indicating partitioning pattern of an image, several regions of the image being defined by the partition information, wherein the depth information further includes maximum disparity information specifying a maximum disparity value in the image and minimum disparity information specifying a minimum disparity value in a region of the several regions, and wherein the depth information further indicates whether to switch the 3D content to 2D content while the OSD is overlaid onto the 3D content.

8. The method of claim 7, wherein the depth information further includes region identification information identifying the region of the several regions.

9. The method of claim 7, wherein the depth information further includes number information indicating the number of regions in horizontal axis or vertical axis of the image.

10. The method of claim 7, wherein the depth information is included in a SEI massage.

11. The method of claim 8, wherein the depth information further includes priority information specifying priority for displaying of the region identified by the region identification information.

* * * * *